Nov. 11, 1947.  C. H. GLANZ, JR  2,430,634
ELECTRIC CLUTCH MOTOR
Filed Nov. 15, 1944  2 Sheets-Sheet 1
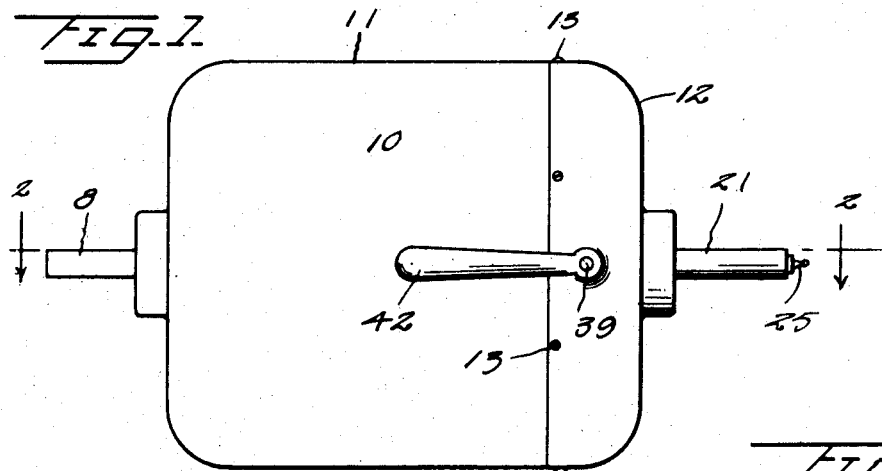
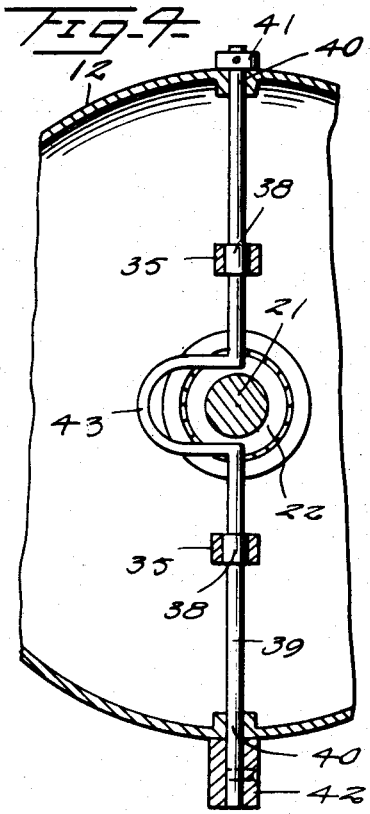
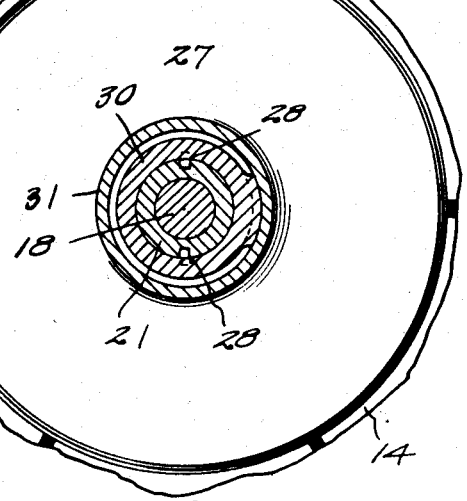
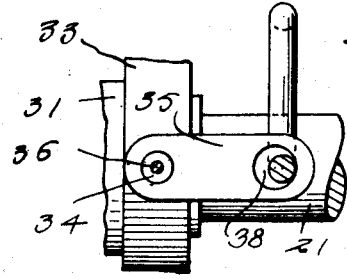
Inventor
C. H. Glanz, Jr.
By Randolph & Beavers
Attorneys

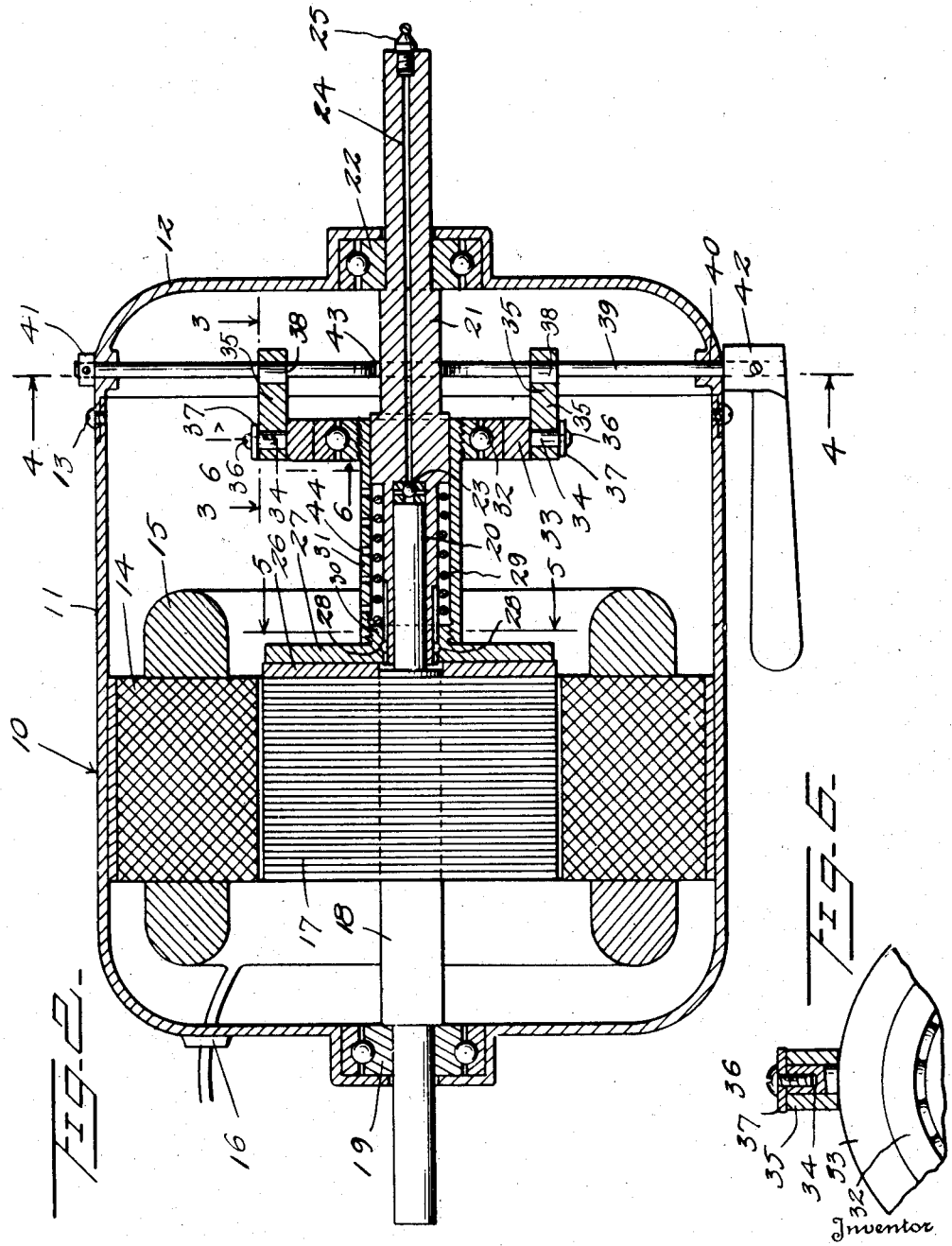

Patented Nov. 11, 1947

2,430,634

UNITED STATES PATENT OFFICE 2,430,634

ELECTRIC CLUTCH MOTOR

Christian H. Glanz, Jr., Louisville, Ky.

Application November 15, 1944, Serial No. 563,592

2 Claims. (Cl. 172—120)

1

This invention relates generally to electric motors and more particularly to a new and improved clutch arrangement therefor in which a plurality of power take-off shafts are provided on a single motor whereby power may be supplied therefrom either continuously or intermittently or continuously and intermittently concurrently, the ultimate object being to provide a motor which is simple in construction, durable and reliable in operation, and well adapted to carry loads of different character.

Other objects and advantages of the invention will become more clearly apparent from the following detailed description thereof taken in connection with the accompanying drawings in which:

Figure 1 is a plan view of an electric motor constructed in accordance with a preferred embodiment of the invention, Figure 2 is an enlarged sectional view of the motor as seen along the line 2—2 of Figure 1, Figure 3 is a sectional view taken along the line 3—3 of Figure 2, Figure 4 is a fragmentary sectional view of the motor as seen along the line 4—4 of Figure 2, Figure 5 is an enlarged sectional view taken along line 5—5 of Figure 2; and Figure 6 is a fragmentary sectional view as seen along the line 6—6 of Figure 2.

Referring now to the drawings for a more complete understanding of the invention, the numeral 10 generally designates an electric motor of the squirrel cage type having a frame or housing 11 to which the usual end bell 12 is secured as by screws 13. A stator core 14 is received interfittingly within the frame 11 and carries the stator winding 15 in the usual manner, the leads from the winding being extended through the frame as at 16. The rotor 17 of motor 10 is secured as by a press fit to a shaft 18, one reduced end portion of which is rotatively supported in a ball bearing 19 carried by frame 11 and the other reduced end portion of which is rotatively supported in an axial bore 20 provided in a shaft 21 which is axially aligned with rotor shaft 18 and has a reduced end portion which is rotatively supported in a ball bearing 22 carried by end bell 12, bearings 19 and 22 being arranged in axial alignment and concentric with respect to the supporting members individual thereto as in conventional motor design or practice.

An end thrust and spacer bearing 23 is provided between shafts 18 and 21 and lubricant is supplied to this bearing and to the journal bearing between the shaft by way of the reduced bore 24

2 in shaft 21 which terminates in a grease fitting 25.

Thus, by reason of the aforedescribed arrangement, shafts 18 and 21 together serve effectively as a single shaft support or composite shaft for the rotor 17. However, shaft 18 is driven continuously as the rotor rotates, but shaft 21 is driven only when connected to the rotor by clutch means presently to be described.

The clutch means comprises a friction disc or clutch plate 26 which is secured to the rotor 17 and a coacting clutch plate or disc 27 which is slidably supported for axial movement on the inner reduced end portion of shaft 21 and is secured thereto for rotation therewith by means of a slot and key arrangement generally designated 28.

Clutch plate 27 is normally urged axially of shaft 21 and its engagement with clutch plate 26 by a coil spring 29 interposed between the hub portion 30 of plate 27 and shoulder 31 on shaft 21. The hub portion 30 is threaded to receive a tubular member 31 on one end thereof and is arranged on the other end thereof to fit telescopingly with shaft 21, the outside of the latter end being threaded to receive a ball bearing 32 which carries a clutch yoke 33. Yoke 33 carries diametrically opposed pins 34 which serve as pivots for the clutch arms or links 35, the arms being secured against lateral movement on the pins by means of screws 36 and washers 37 carried thereby.

Each of arms 35 on the other end thereof is provided with a hole for receiving an eccentric 38 carried by clutch control shaft 39. Shaft 39 is journalled in suitable bearings 40 therefor provided in motor bell 12 and carries on one end thereof a set screw collar 41 and a control lever 42 on being offset as at 43 to clear shaft 21. Holes 44 may be provided in member 31, if desired to permit escape of excessive lubricant.

From the foregoing description the operation of the clutch motor should now be apparent. It will suffice, therefore, merely to point out that with the motor in operation and with the control lever in the position as shown clutch discs 26 and 27 are engaged under the pressure of coil spring 29 and, accordingly, both shafts 18 and 21 rotate to supply power from the motor continuously.

When it is desired to take power from shaft 21 intermittently, it merely is necessary to rock control lever 42 up or down whereupon movement of the eccentrics 38 acts through arms 35, yoke 33, bearing 32, and member 31 to disengage disc 27 from disc 26. With the discs separated, shaft 21 is brought to a stop, but shaft 18, however, continues to rotate. Such an arrangement for a motor is desirable, for example, in a hot air heating system in which shaft 18 could be employed to drive a fan for distributing the heated air continuously whereas shaft 21 could be employed to drive the oil burner which usually is operated intermittently only.

Moreover, it will be apparent that shaft 18 may be used separately to carry a load continuously as in the case of a fan load, or shaft 21 may be employed to carry a stop and start load as in the case of sewing machines, for example.

Furthermore, it will be apparent that spring or weight means may be employed to bias the clutch to a disengaged position, in which case power is drawn from shaft 21 intermittently as lever 42 is manipulated. It also will be apparent that two clutches may be employed in accordance with the principles set forth in the present invention, one clutch being employed on each side of the rotor such that both ends of the motor shaft may be driven continuously and/or intermittently respectively.

While the invention has been described in particularity with respect to best one embodiment thereof, it is the intention in the appended claims to cover the full range of equivalents, thereof commensurate with the scope and spirit of the invention.

I claim as my invention:

1. An electric motor comprising a housing, a field assembly in the housing, an armature rotatably supported within the field assembly, a shaft projecting from one end of the armature and extending through one end of the housing, said shaft extending through the armature and provided with a clutch plate and a reduced extension projecting beyond the clutch plate, a secondary shaft journaled through the other end of the housing and provided with a hollow end portion receiving said reduced shaft extension, a clutch plate cooperative with the first mentioned clutch plate and being slidable on the hollow end of the secondary shaft, said secondary shaft being provided with a circumferential shoulder, a sleeve slidable on the shoulder and being connected to the second mentioned clutch plate, a coiled compression spring on the hollow end of the secondary shaft interposed between the shoulder and the second mentioned clutch plate for urging the latter plate against the first mentioned clutch plate, a yoke surrounding the sleeve, a bearing assembly swivelly connecting the yoke to the sleeve, and means for actuating the yoke to disengage the second mentioned clutch plate from the first mentioned plate, said second mentioned plate being slidably connected to the hollow end of the secondary shaft.

2. An electric motor comprising a housing, a field assembly in the housing, an armature rotatably supported within the field assembly, a shaft projecting from one end of the armature and extending through one end of the housing, said shaft extending through the armature and provided with a clutch plate and a reduced extension projecting beyond the clutch plate, a secondary shaft journaled through the other end of the housing and provided with a hollow end portion receiving said reduced shaft extension, a clutch plate cooperative with the first mentioned clutch plate and being slidable on the hollow end of the secondary shaft, said secondary shaft being provided with a circumferential shoulder, a sleeve slidable on the shoulder and being connected to the second mentioned clutch plate, a coiled compression spring on the hollow end of the secondary shaft interposed between the shoulder and the second mentioned clutch plate for urging the latter plate against the first mentioned clutch plate, a yoke surrounding the sleeve, a bearing assembly swivelly connecting the yoke to the sleeve, and means for actuating the yoke to disengage the second mentioned clutch plate from the first mentioned plate, said second mentioned plate being slidably connected to the hollow end of the secondary shaft, said means for actuating the yoke comprising a pair of arms projecting from the yoke and having openings therein, a shaft extending through the housing transversely and provided with a handle at one end thereof and cams on the shaft and operating in the openings of the arms to move said arms and the yoke structure in shifting the second mentioned clutch plate.

CHRISTIAN H. GLANZ, Jr.

REFERENCES CITED

The following references are of record in the file of this patent:

UNITED STATES PATENTS

| Number | Name | Date |
|---|---|---|
| 1,298,376 | Neuland | Mar. 25, 1919 |
| 1,669,507 | Dickson | May 15, 1928 |
| 1,826,172 | Greenwald | Oct. 6, 1931 |
| 2,039,714 | Fuller | May 5, 1936 |
| 2,149,873 | Shapiro et al. | Mar. 7, 1939 |
| 2,263,156 | Abel | Nov. 18, 1941 |

FOREIGN PATENTS

| Number | Country | Date |
|---|---|---|
| 5,985 | Great Britain | 1910 |
| 225,564 | Great Britain | Dec. 31, 1925 |
| 436,195 | Germany | Oct. 25, 1926 |